United States Patent

Boyer

[15] 3,650,495

[45] Mar. 21, 1972

[54] TAPE CARTRIDGE

[72] Inventor: George Wesley Boyer, Covina, Calif.

[73] Assignee: Leach Corporation, South Pasadena, Calif.

[22] Filed: Dec. 20, 1968

[21] Appl. No.: 785,551

[52] U.S. Cl. ....242/192, 242/199, 242/210
[51] Int. Cl. ....G03b 1/04, G11b 15/22, G11b 23/04
[58] Field of Search ....242/197–200, 210, 242/71.2, 192

[56] References Cited

UNITED STATES PATENTS 3,236,468 2/1966 Foret....242/199
2,911,162 11/1959 Kyle, Jr....242/200
3,027,110 3/1962 Andrews....242/210
3,075,717 1/1963 Kingston....242/200
3,265,317 8/1966 Liang et al....242/198 X
3,341,142 9/1967 Namgnyi-Katz....242/199
3,408,017 10/1968 Hashimoto....242/200
3,411,731 11/1968 Kelley....242/199

*Primary Examiner*—John Petrakes
*Attorney*—Jackson & Jones

[57] ABSTRACT

A tape cartridge for a tape recording system is described having a rectangular housing for rotatably supporting a pair of standard reels. The cartridge includes a cover which can be removed to permit access to the interior of the housing to repair the magnetic tape or remove the reels. The cartridge is adapted to expose the tape to capstan and magnetic head assemblies while permitting drive means to be inserted within the housing to engage the take-up and supply reels.

8 Claims, 1 Drawing Figure

PATENTED MAR 21 1972
3,650,495
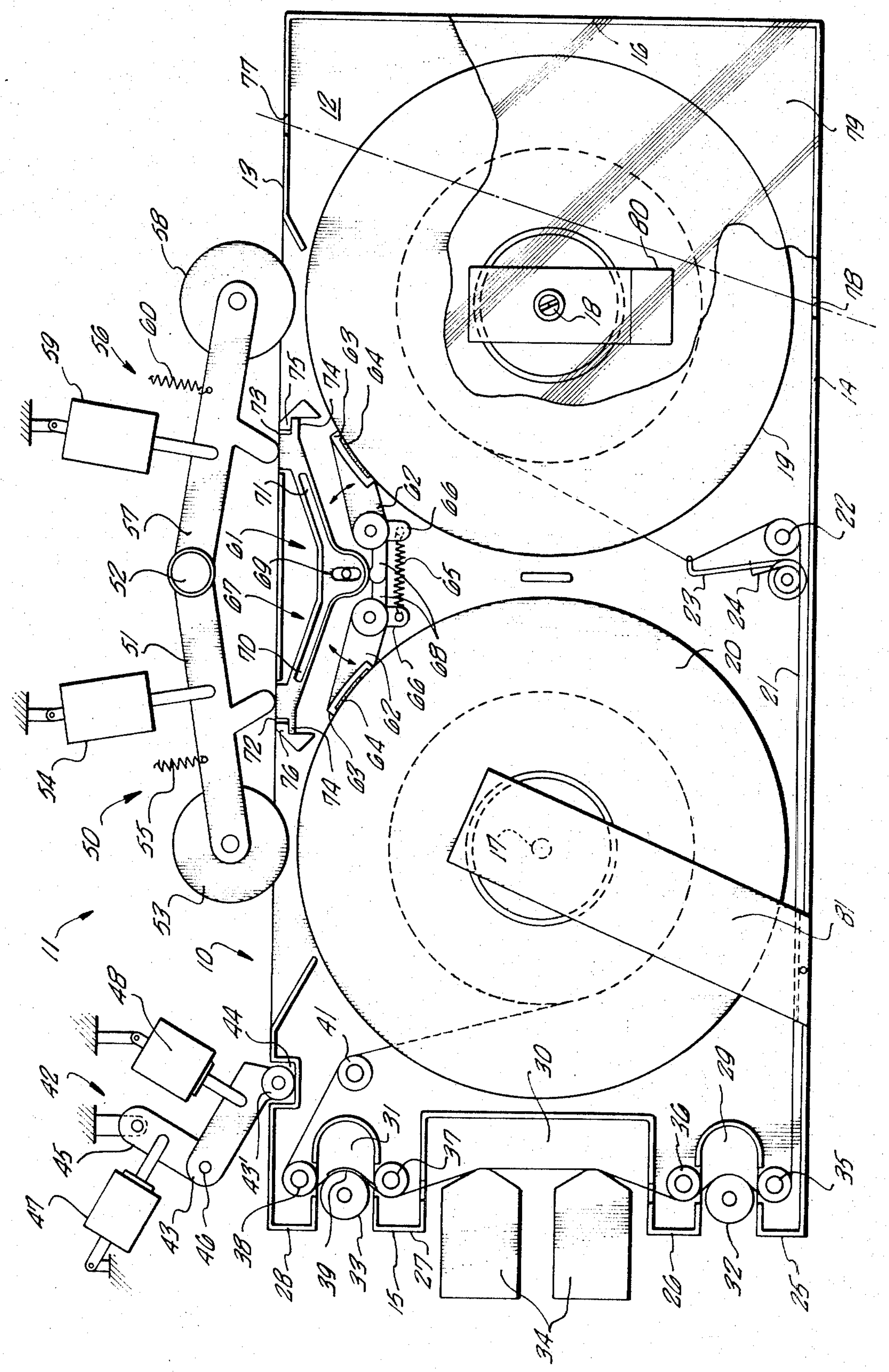

TAPE CARTRIDGE

BACKGROUND OF THE INVENTION

1. Field of the Invention

This invention relates to recording systems and more particularly to tape cartridges utilized in such systems.

2. Description of the Prior Art

In a magnetic tape recording system the supply reel of magnetic tape is usually inserted into the system with the magnetic tape being unwound from the supply reel, drawn through capstan and magnetic head assemblies and wound onto a takeup reel. The capstan assembly functions to frictionally drive the magnetic tape while the magnetic head assembly functions to either erase, record or reproduce sound transmissions from the tape. The problem with many systems is that the tapes are difficult to manipulate because they must be threaded through a plurality of guides, the capstan and magnetic head assemblies, and onto the takeup reel. Such an operation is complex and time consuming, with the high probability of errors being made. This problem has been overcome with the advent of the tape cartridge.

The tape cartridge is a complete, self-contained unit which houses the supply and takeup reels along with guide means to expose the tape to the capstan and magnetic head assemblies. The cartridge is designed to receive drive means from the system to drive the reels, usually in either direction. In operation the cartridge is inserted as a unit into a compartment formed in the system with the exposed tape frictionally engaging the capstan and magnetic head assemblies. At no time is it necessary for the user to manipulate the tape which makes such an operation simple and convenient, and also eliminates the possibility of errors caused by improper threading. Such systems have largely been used in automobile tape decks, miniature tape recorders and other systems where tape winding would be impractical.

Although tape cartridges have many advantages, various difficulties have been encountered. One such problem has been that if the tape breaks due to improper handling it cannot be easily repaired or removed. As a result the entire cartridge is unusable and must either be thrown away or returned to the manufacturer for repairs. Furthermore the reels cannot be removed to allow the tape to be replaced by a new one. Also the reels utilized in such cartridges are specially designed for such assemblies; hence standard reels cannot be used as a replacement should such a substitution be necessary. Furthermore, such specialized reels can not be utilized on standard recorders even if they were removed. Therefore, while such cartridges may be utilized in recording systems for various uses, these shortcomings have limited their wide-spread application.

SUMMARY OF THE INVENTION

This invention obviates the problems encountered by prior tape cartridges by providing a tape cartridge that includes a rectangular housing having a side wall adjoined to top, bottom and forward walls. The side wall rotatably supports a standard supply reel and a takeup reel. The tape from the supply reel is drawn through guide means to the forward wall to extend across a plurality of cavities formed on the forward wall to engage the capstan and magnetic head assemblies. The takeup and supply reels are adapted to be driven at their peripheries by respective puck assemblies extending through openings formed in the top wall. A brake assembly is also located within the housing for securing the reels when they are inoperative. Orifices are also formed on the top and bottom walls to provide an optical path for a photo sensor to monitor the amount of magnetic tape on the supply reels. Finally, a cover is removably attached to the housing to permit easy access to the interior for repairing the magnetic tape or removing the reels.

Thus, the invention fulfills a primary objective by providing a tape cartridge that is insertable into a tape recorder to readily engage the capstan and magnetic head assemblies.

Another object of the invention is to provide a tape recorder that is adapted to receive standard reels that can be removed and used on standard recorders for playback purposes.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWING

The FIGURE is a plan view of a tape cartridge, in accordance with the invention, being inserted within a tape recorder.

DESCRIPTION OF THE PREFERRED EMBODIMENT:

The FIGURE shows a tape cartridge, generally indicated by arrow 10, being inserted within a tape recorder assembly, generally indicated by arrow 11. The tape cartridge 10 is a rectangular housing which includes a side wall 12 adjoining top and bottom walls 13 and 14 and forward and rear walls 15 and 16. A pair of spools 17 and 18 are connected to the side wall 12 for receiving a supply reel 19 and a takeup reel 20 respectively. The reels 19 and 20 are conventional and may be purchased commercially. The supply reel 19, located on the rear half of the housing, has a magnetic tape 21 wound thereon. The tape 21 extends out of the supply reel 19 and around a first guide means 22 located adjacent the supply reel 19. The guide means 22 forms a cylindrical race-way made of plastic or mylar material. A pressure finger 23 is located adjacent the first guide means 22 and is spring biased by a spring 24 to maintain the tape 21 in tension therebetween. The tape 21 then extends toward the forward wall 15.

The forward wall 15 comprises a plurality of projections 25, 26, 27 and 28 with a first cavity 29 defined between projections 25 and 26, a second cavity 30 defined between projections 26 and 27, and a third cavity defined between projections 27 and 28. The first and third cavities 29 and 31 are adapted to receive a pair of capstans 32 and 33 while the second cavity 30 is adapted to receive a magnetic head assembly 34. A plurality of guides 35, 36, 37 and 38 are located within the respective projections 25, 26, 27 and 28. Openings are also formed within the walls of the projections to permit the tape 21 to extend around the guide means and across the cavities 29, 30 and 31. Shown in its operating position, the tape cartridge 10 is moved forward until the magnetic tape 21 extends around the capstans 32 and 33 and is frictionally driven thereby. A leaf spring 39 is integrally connected to the guide means 37 and is arcuately shaped to extend across the cavity 31 for biasing the magnetic tape 21 against the capstan 33. In the operating position the magnetic head assembly extends into the second cavity 30 to frictionally engage the magnetic tape 21 in the conventional manner. In completing the circuit, the tape 21 extends around the guide 38 to a guide 41 and then on to the takeup reel 20. It is noted that all of the guide means engage the magnetic tape on the non-recording side, eliminating the possibility of the recording side of the tape being damaged by a worn guide.

As shown, the cartridge 10 is maintained in its operating position by means of a locking assembly 42. The locking assembly 42 includes an arm 43 having a roller 43' connected at one end which is insertable within a slot 44 formed within the top wall 13. The other end of the arm 43 is pivotally connected by pin means 46 to one end of a movable link 45 which in turn is pivotally connected to the housing of the tape recorder assembly. If it is desired to move the tape cartridge and the tape 21 out of engagement with the capstan and magnetic head assemblies, the link 45 is pivoted in a counterclockwise direction by means of solenoid means 47. This movement causes the pin means 46 to move about an arc in the rearward direction. Since the other end of the arm 43 is confined within the slot 44, the rearward movement of the pin means 46 causes the arm 43 to move the tape cartridge 10 rearwardly a sufficient distance to remove the tape 21 from engagement with the capstan and magnetic head assemblies. If it were desired to remove the tape cartridge 10 entirely from the tape recorder, solenoid means 48 are provided to pivot the arm 43 upwardly about the pin means 46 to disengage the roller 43' from the slot 44 thereby releasing the cartridge.

During the recording cycle the takeup reel 20 is driven at its periphery by means of a puck assembly 50 in order to take up the tape fed by the capstan drive. The puck assembly 50 includes a leg 51 pivotally connected to a shaft 52. A drive wheel 53 is rotatably connected to the free end of the leg 51 and is adapted to engage the periphery of the takeup reel 20. Therefore to drive the takeup reel 20, the leg 51 is pivoted downward by means of a solenoid 54 until the drive wheel 53 engages the periphery of the takeup reel 20. The drive wheel 53 is then rotatably driven by belt means, not shown, in the conventional manner. When the recording cycle is completed the solenoid 54 is deactuated and the leg 51 is drawn upward by means of a spring 55.

During the rewinding cycle the supply reel 20 is driven in the reverse direction by means of a rewind puck assembly 56, which includes a leg 57 which is also pivotally mounted upon axis 52. A drive wheel 58 is pivotally mounted about the other end of the leg 57 and is adapted to frictionally engage the periphery of the supply reel 19. To initiate the rewinding cycle, the leg 57 is pivoted downwardly by means of a solenoid 59. The drive wheel 58 is likewise rotatably driven by belt means, not shown, in the conventional manner. Upon completion of the rewinding cycle the solenoid 59 is deactuated and the leg 57 is drawn upward by means of a spring 60.

It is noted that during the recording and rewinding cycles, the reels 19 and 20 are permitted to freely rotate. However, when the puck assemblies 50 and 56 are not operating, the reels 19 and 20 are frictionally locked in position by means of brake means 61. Such means firmly secure the reels 19 and 20 within the cartridge 10 when the cartridge 10 is removed from the tape recorder assembly 11. The brake assembly 61 includes a pair of arms 62 pivotally connected to the side wall 12. A shoe 63 is integrally formed at the end of each of the arms 62 with a friction pad 64 located therein. The arms 62 also include projections 66 extending downward therefrom and are drawn together by means of a spring 65 which in turn biases the arms 62 against the peripheries of the reels. To overcome the spring force and disengage the friction pads 64 from the periphery of the reels 19 and 20, a trigger mechanism, shown generally by arrow 67, is provided to engage a pair of extensions 68 which are also integrally connected to the arms 62. The trigger mechanism 67 is secured to the side wall 12 and is permitted to move along a slot 69 formed therein. The trigger mechanism 67 includes two lever arms 70 and 71 which extend through openings 72 and 73, formed in the top wall 13. The trigger mechanism 67 is held in its upward position by the spring means 65 with the lever arms having a pair of projections 74 engaging a pair of latch means 75 and 76 formed on the top wall 12. The portion of the lever arms 70 and 71 that extend through the openings 72 and 73 respectively are adapted to engage the legs 51 and 57 of the puck assemblies 50 and 56.

During the recording cycle as the leg 51 moves downwardly, it engages the lever arm 70 to pivot the trigger mechanism about the latch means 75. This, in turn, moves the extensions 68 downward, which causes the arms 62 to move upward thereby disengaging the friction pads 64 from contact with the reels.

Likewise during the rewinding cycle as the leg 57 moves downwardly, it engages the lever arm 71 to pivot the trigger mechanism about the latch means 76. Such a movement again causes the trigger mechanism to disengage the friction pad 64 from the reels 19 and 20 in the manner described above.

Means are also provided to monitor the amount of magnetic tape 21 wound on the supply reel 19. Such a means is defined by a pair of orifices 77 and 78 defined within the top and bottom walls 13 and 14. The orifices 77 and 78 are positioned in such a manner that they provide an optical path therebetween such that when the tape 21 is unwound from the supply reel 19 sufficiently, a light beam is projected therethrough. A photo sensor, not shown, is then actuated to relay this information to the logic system.

An important feature of the invention is that the portions of the walls adjacent to the optical path are painted black (not shown) to render the wall sections impervious to outside light rays to permit the photo sensor to function properly.

A cover 79 is adapted to be removably connected to the housing of the tape cartridge 10. The cover 79 further includes spring means 80 to biasingly engage the reels 19 and 20, of which one is shown, to maintain the reels 19 and 20 under a slight tension at all times. Although the cover 79 completely encloses the cartridge 10, another embodiment is shown whereby a leaf spring 81 is pivotally connected to the bottom wall 14 and extends to the hub portion of the reel 20 for frictional engagement therewith to maintain the reel 20 under tension. Although only one leaf spring is shown, another leaf spring can be provided to maintain the supply reel 20 under tension. If it is desired to remove the reels 19 and 20 from the cartridge the leaf springs 81 are pivoted downwardly to be disengaged from the reels and permit access thereto.

An important advantage of the tape cartridge 10 is that it is adapted to receive conventional or standard reels. Not only is this convenient, but the tape can easily be repaired and the reels can conveniently be removed or substituted. This enables the reels to be inserted into conventional or standard recorders for playback purposes. As a result the tape cartridge 10 has all the advantages of conventional cartridges along with the advantages of regular tape systems.

What is claimed is:

1. A tape cartridge for receiving a supply reel and a takeup reel comprising:
   - a cartridge housing formed by a bottom wall and peripheral side walls;
   - means on said bottom wall for rotatably supporting the supply reel and the takeup reel;
   - a pair of apertures formed in one of said side walls for receiving supply and takeup reel drive means; and
   - brake means adapted to frictionally engage the peripheries of the supply and takeup reels for locking said reels during non-use, said brake means further comprising trigger means adapted to be contacted by either of said reel drive means for releasing said brake means, said brake means further comprising a pair of arms pivotally mounted on said bottom wall, one end of each arm including a shoe having a friction pad located therein for frictionally engaging the peripheries of the supply and takeup reels.

2. The invention of claim 1 wherein said brake means further comprises spring means for biasing said arms against the reels and said trigger means being movably mounted adjacent said arms for pivoting said arms away from the reels when contacted by either of said reel drive means.

3. The invention of claim 2 wherein said trigger means further comprises a pair of lever arms extending toward said pair of apertures and through a second pair of orifices for engagement with said reel drive means.

4. The invention of claim 3 wherein said lever arms converge to form a boss portion, and said brake arms further comprise a pair of extensions extending from the pivotal axes of said arms and converging to contact said boss portion for pivoting said brake arms away from the reels upon a downward movement of said boss portion.

5. A tape cartridge for receiving a supply reel and a takeup reel having a quantity of tape mounted thereon comprising:
   - a cartridge housing formed by a bottom wall and peripheral side walls;
   - means on said bottom wall for rotatably supporting the supply reel and the takeup reel; and a pair of orifice means formed on two of the opposing side walls for defining an optical light transmission path cutting across the supply reel tangential to the hub thereof when the tape is substantially removed from the supply reel, said orifice means being adapted to cooperate with a photoelectric system on a tape transport to monitor the amount of tape on the supply reel by creating a light signal through the optical path when the tape is unwound below the light transmission path.

6. The invention of claim 5 wherein the portions of the bottom and side walls adjacent said orifice means further comprise means for blackening said portions to be impervious to outside light.

7. The invention of claim 1 further comprising a pair of orifice means formed on two of the opposing side walls for defining an optical light transmission path cutting across the supply reel tangential to the hub thereof when the tape is substantially removed from the supply reel, said orifice means being adapted to cooperate with a photoelectric system on a tape transport to monitor the amount of tape on the supply reel by creating a light signal through the optical path when the tape is unwound below the light transmission path.

8. The invention of claim 7 wherein the portions of the bottom and side walls adjacent said orifice means further comprise means for blackening said portions to be impervious to outside light.

* * * * *